Jan. 9, 1968 J. F. TRACY 3,362,650
METHOD AND MEANS FOR THE TREATMENT OF GARBAGE
Filed June 7, 1965 5 Sheets-Sheet 1

FIG. 1

INVENTOR
JAMES F. TRACY

BY

ATTORNEY

INVENTOR
JAMES F. TRACY

Jan. 9, 1968 J. F. TRACY 3,362,650
METHOD AND MEANS FOR THE TREATMENT OF GARBAGE
Filed June 7, 1965 5 Sheets-Sheet 5

INVENTOR
JAMES F. TRACY
BY
ATTORNEY

United States Patent Office 3,362,650
Patented Jan. 9, 1968

3,362,650
METHOD AND MEANS FOR THE TREATMENT OF GARBAGE
James F. Tracy, 2621 Palisade Ave., Staten Island, N.Y. 10463
Filed June 7, 1965, Ser. No. 461,844
21 Claims. (Cl. 241—21)

ABSTRACT OF THE DISCLOSURE

A garbage treating system includes a water filled settling tank provided with a rapidly moving current to remove the lighter, organic material from the tank as the denser, inorganic material settles to the bottom of the tank. A carriage with a cutting grid and a propeller operates along the length of the tank. The organic material is finely divided by an additional impeller and grid device after its removal from the settling tank and is then deposited on filter beds wherein the water is drained from the organic material, and which is then piled into windrows for composting.

---

This invention relates to the treatment of garbage and, particularly, to the sorting and conversion of garbage into useful material.

Apparatuses for the conversion of garbage into fertilizer are known. These generally involve the conversion of manually selected garbage into fertilizer by heating the garbage in ovens over a period of time. Such apparatuses are both slow and expensive; the result being that most garbage is either simply incinerated or used as land-fill.

It is, therefore, an object of this invention to provide a method and an apparatus for the continuous, rapid and economical conversion of garbage, as it is collected from the community, into useful material.

It is another object of this invention to provide a method and an apparatus for the continuous separation of the garbage into non-organic material which is useful as is, and into organic material which is converted into useful fertilizer.

It is yet another object of this invention to provide a method and an apparatus for the continuous conversion of large pieces of organic material into finely divided pieces which are then relatively rapidly converted into fertilizer.

It is still another object of this invention to provide a method and apparatus for the cleaning, recycling and re-use of the carrier medium for the garbage.

Features of this invention include the provision of a water-filled settling tank which is provided with a rapidly moving current to remove the lighter, organic material from the tank as the denser, inorganic material settles to the bottom of the tank. The organic material is finely divided after its removal from the settling tank and is then deposited on filter beds wherein the water is drained from the organic material and which material is then piled into windrows for composting. After an initial period of anerobic composting, the interiors of the windrows may be exposed to the atmosphere by passageways made by augers for further aerobic composting.

These and other objects, features and advantages of this invention will be apparent by reference to the following description taken in conjunction with the accompanying drawings, in which:

FIGURE 1 is a view in elevation of a garbage reclamation plant embodying this invention;

Figure 2:
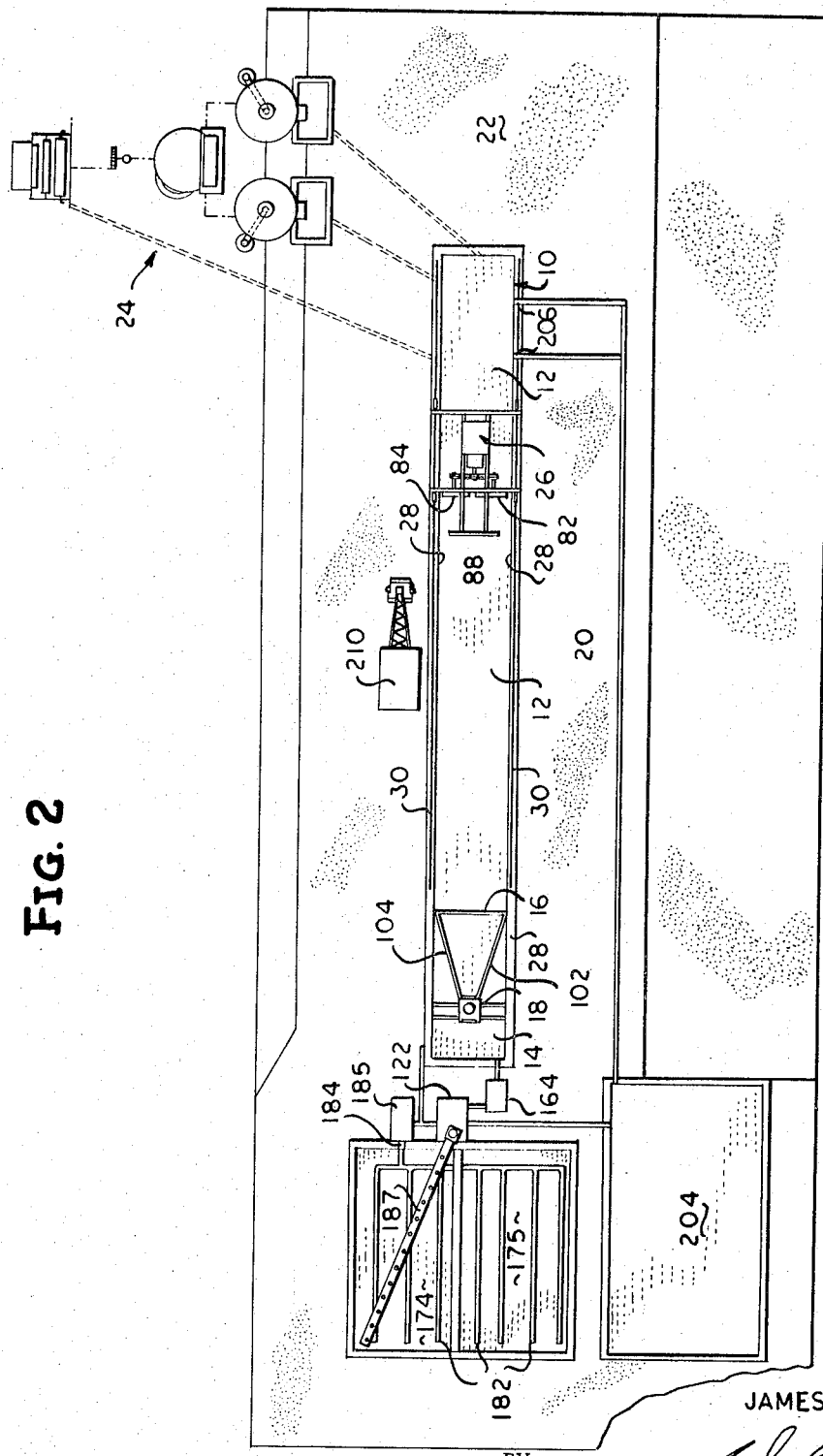
FIGURE 2 is a view in plan of the plant of FIGURE 1.
Figure 3:
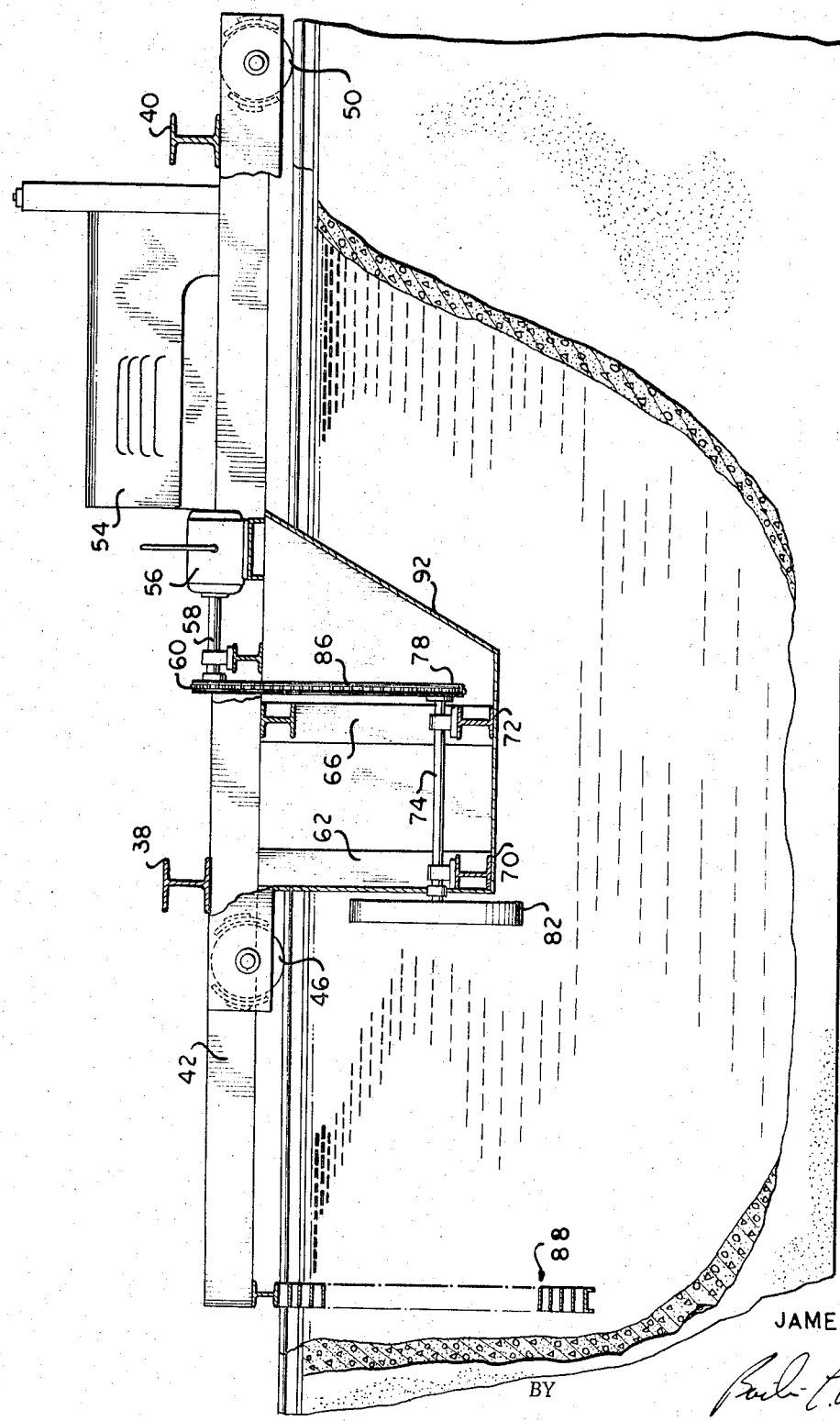
FIGURE 3 is a detail view in plan of the shredder apparatus of FIGURE 1.

Turning now to FIGURES 1 and 2, the garbage reclamation plant embodying this invention includes an elongated pit 10, which is divided into a settling tank 12 and a stock chamber 14 by a secreen 16 and a hydro-cutter or sizing machine 18. A truck dumping apron 20 is provided adjacent the settling tank, and a paper storage area 22 and a paper pulping machine 24 are provided adjacent the apron. The trucks which collect the garbage from the community dump the garbage on the apron 20. The larger quantities of paper may be separated manually from the garbage and transferred to the paper storage area 22. The remaining garbage, or all of the garbage if the paper to garbage ratio is not economically high, is dumped into the settling tank. This tank is made adequately large so that the entire collection of garbage may be dumped into the tank without storage in the atmosphere. The garbage is normally collected during a limited period of time during the day, while the plant is advantageously operated continuously through the entire 24 hours of the day.

Figure 4:
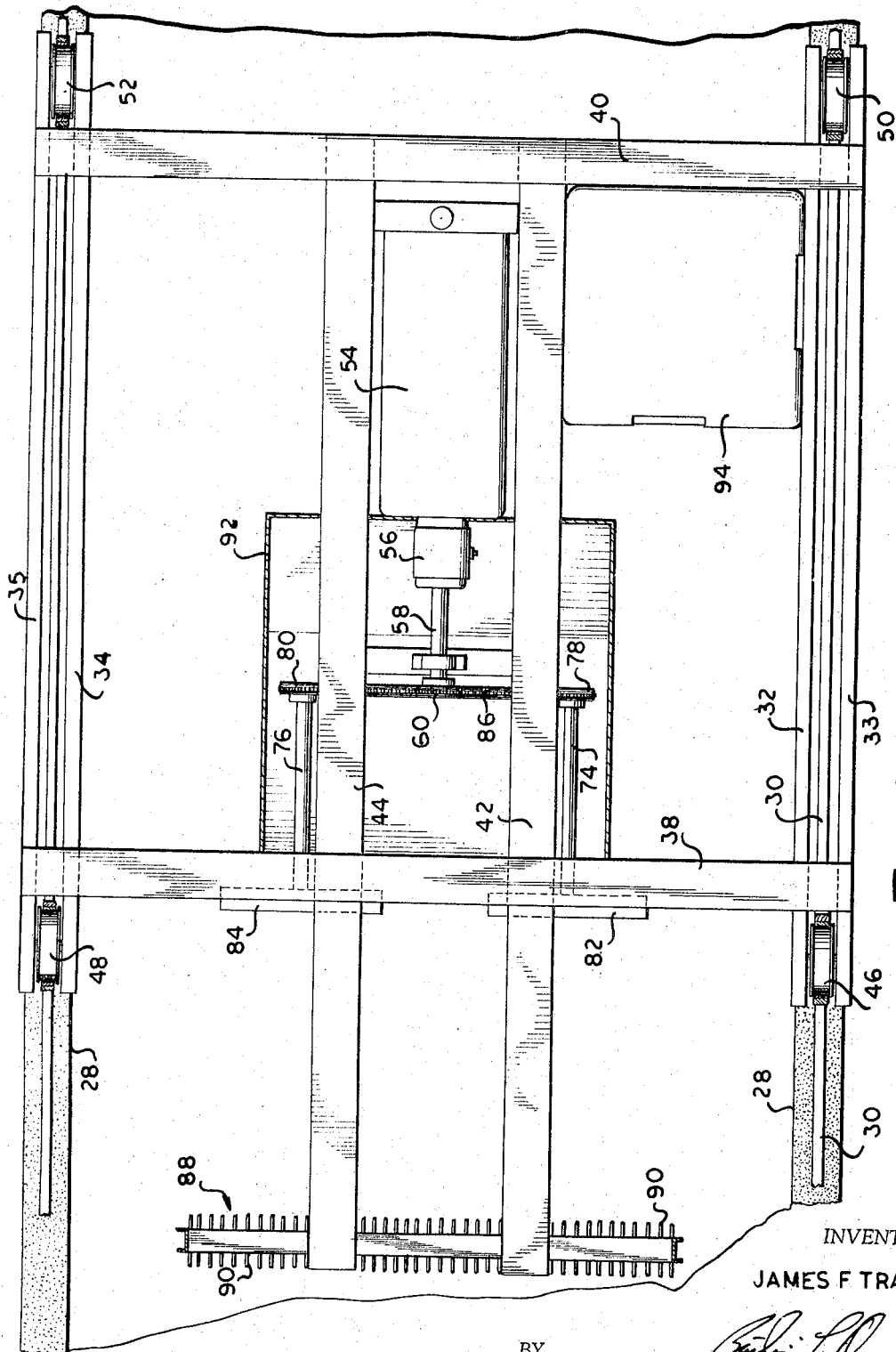
FIGURE 4 is a detail view in elevation of the shredder apparatus of FIGURE 3.

A mobile shredder 26 is disposed in the settling tank to shred the organic material, as shown in FIGURE 4. The elongated pit 10 is lined with a reinforced concrete wall 28. Along the top of this wall on both sides of the settling tank 12 is a rail 30. A carriage 36, including two transverse beams 38 and 40, two longitudinal beams 42 and 44, and two pairs of channels 32, 33 and 34, 35, travels back and forth the length of the settling tank. The carriage is supported on four wheels, 46, 48, 50 and 52, one at each end of the pairs of channels, which wheels ride on the rails. Each of the wheels is provided with a pair of brake shoes. An engine 54 is fixed to the carriage and drives a marine type planetary clutch 56 which is coupled to a shaft 58 mounted in suitable bearings to the carriage. A sprocket wheel 60 is fixed to the shaft 58.

Four vertical beams 62, 64, 66 and 68 are suspended from the longitudinal beams 42, 44, and support two transverse beams 70 and 72 below the water level of the settling tank. Two shafts 74 and 76 are mounted in suitable bearings between these beams 74 and 76, and at the engine proximal end, have fixed thereto respectively sprocket wheels 78 and 80, and at the other end have fixed thereto respectively propellers 82 and 84. An endless drive sprocket chain 86 engages the sprocket wheels 78, 80 and 60. A grid 88, made of double edged knives 90, closely spaced, e.g., on five inch centers, and fixed between channels, is fixedly mounted below the water level of the settling tank, from the engine remote ends of the longitudinal beams 42 and 44. A watertight enclosure 92 is mounted under the carriage to enclose the sprocket drive and the shaft bearings. An operator's cab 94 may be mounted on the carriage for the control of the shredder.

In operation, the engine 54, through the clutch 56 and the shafts and sprocket system, drives the propellers 82 and 84 either clockwise or counter-clockwise. The rotation of the propellers drives the shredder carriage along the length of the settling tank 12, under the control of the brake shoes on the wheels 46, 48, 50 and 52. The rotation of the propellers also creates a turbulence in the settling tank which enhances the separation of the lighter material from the denser material, and either pulls or pushes the lighter material, which is suspended in the water, against and through the double edged knives 90 of the grid 88, shredding this lighter material.

It should be noted that the bottom of the grid is well above the top of the accumulated dense material on the bottom of the settling tank. The dumping is advantageously done along the length of the settling tank at a position where the carriage is not presently located, thereby giving the very dense material time to settle below the level of the grid 88, before the passage thereat of the grid. The turbulence created by the propellers will tend to bring up any settled light material, without raising the dense material significantly.

Additional turbulence is provided in the settling tank by a plurality of water jets 96 which are fed by a supply pipe 98.

Figure 5:
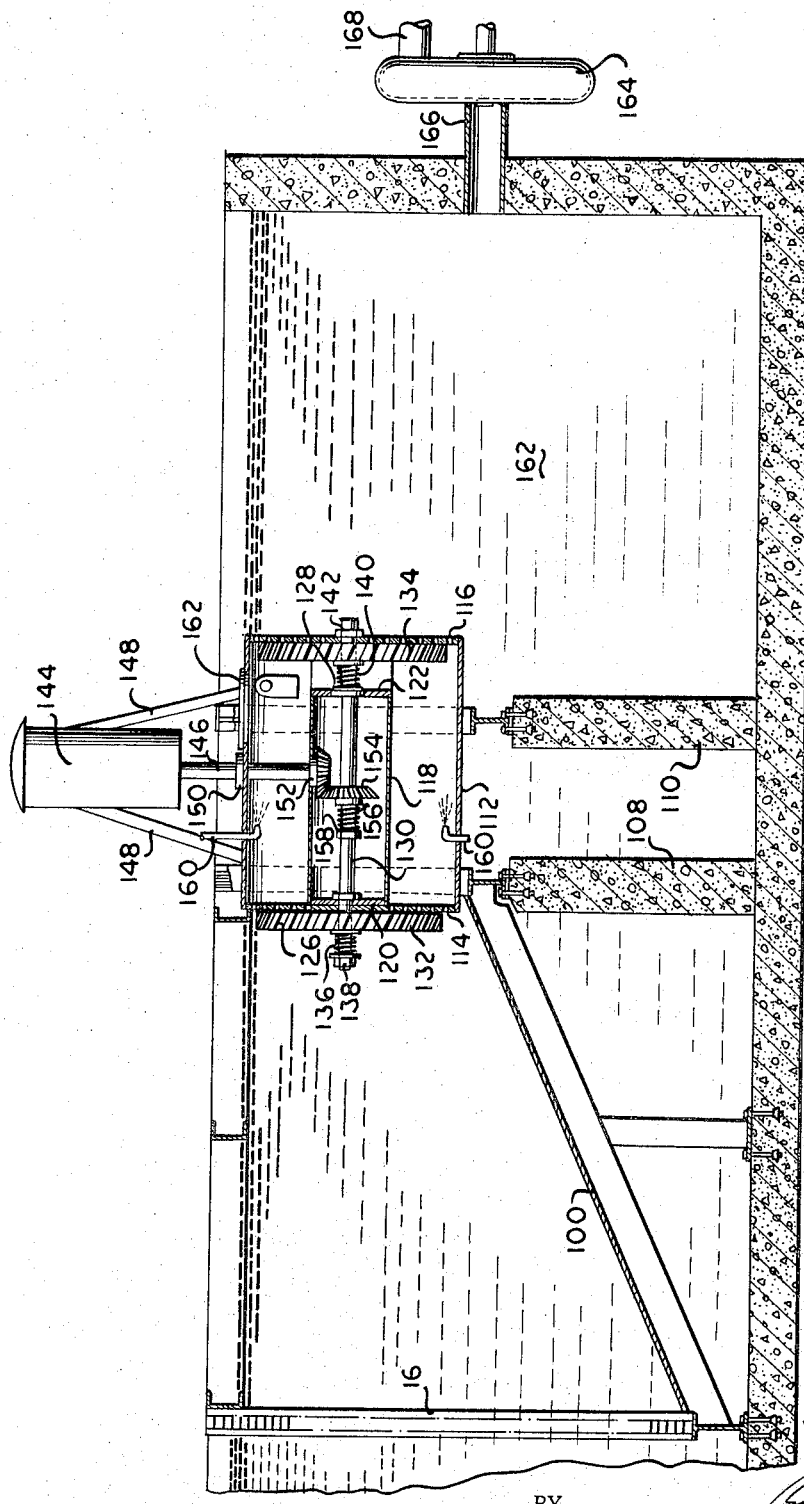
FIGURE 5 is a detail view in elevation of the hydro-cutter of FIGURE 1.

The hydro-cutter or sizing machine 18, as shown in FIGURES 1, 2 and 5, is disposed at the apex of a tunnel formed by an inclined bottom 100 and side walls 102 and 104. The hydro-cutter is mounted in a passageway 106 provided in two lateral walls 108 and 110. The hydro-cutter includes a tunnel or pipe 112 which is anchored in the passageway 106 to the side walls 102 and 104. Two plates 114 and 116 are respectively fixed in each end of the pipe, and each is perforated, e.g. with ¾ inch holes. An inner pipe 118, having end plates 120 and 122, is mounted by a bracket 124 to the upstream end plate 114, coaxially within the outer pipe 112. The downstream inner end plate 120 is spaced from the downstream outer end plate 116. Two bearings 126 and 128 are respectively fixed to the inner end plates 120 and 122, and a shaft 130 is journaled through these bearings and suitable holes in the outer end plates. Two impellers 132 and 134 are keyed to the shaft 130 against rotation, but free for translation. The impeller 132 is disposed upstream of the upstream end plate 114 and is biased against this plate by a compression spring 136 and a nut 138. The impeller 134 is disposed upstream of the downstream end plate 116 and is biased against this plate by a compression spring 140 disposed on the shaft 130 between the end plate 122 and this impeller. A nut 142 on the shaft 130 downstream of the end plate 116 secures the shaft assembly within the pipe 112.

A motor 144 having a vertical output shaft 146 is mounted by brackets 148 to the upper portion of the pipe 112. The shaft 146 passes through a bearing 150 mounted through the top of the pipe 112 into the pipe. A bevel gear 152 is fixed to the end of the shaft 146 and engages a bevel gear 154 mounted on the shaft 130 and fixed against rotation with respect thereto. If desired, the gear 154 may be free to slide longitudinally with respect to the shaft 130 and may be biased against the gear 152 by a compression spring 156 and a nut 158 mounted on the shaft 130.

A plurality of water jets 160 are annularly disposed within the upstream portion of the pipe 112 to direct streams of water downstream for increasing the turbulence within the hydro-cutter. There may be six one-inch jets equally spaced around the interior of the pipe, each providing a stream at 125 p.s.i. A man hole 162 for access into the pipe 112 may be provided at the top of the pipe. The motor and hydro-cutter may be formed as a unit so that it may be entirely removed for maintenance. The pipe 112 may be of four-foot diameter. The screen 16 may be made with two inch by two inch openings. The end plate 114 may be provided with one inch holes, while the end plate 116 may be provided with ¼ in. holes.

The finely divided organic material is discharged from the hydro-cutter 18 into a stock chamber 162. The stock chamber provides intermediate storage for the divided material and its water medium. A motor 163 driven stock pump 164 has its inlet 166 coupled to the downstream end of the stock chamber and its outlet 168 coupled by a pipe 170 to an overhead supply tank 172.

Two filter beds 174 and 175 are disposed downstream of the stock chamber. The filter beds each comprises a concrete wall and floor 176, a lower layer of crushed stone 178, and an upper layer or coarse sand 180. A system of pipes 182 having a plurality of inlets 183 is disposed within the stone layer 178, and is coupled to the inlet 184 of a pump 185 driven by a motor 186. A distribution flume 187 is supported for movement through a horizontal plane over each of the filter beds by an A frame 188 having guy cables 190. The upstream end of the flume 187 is pivotally mounted on a boom step 192 and the downstream end is hung from the boom by a cable 194. The upstream end is gravity fed from an outlet 196 of the supply tank 172. The flume has a plurality of outlets 198 along its length for discharging the finely divided organic material in a water medium onto the filter beds. The outlets 198 adjacent the upstream end may be made smaller than the outlets in the downstream end so that a substantially even flow of material will be provided onto the filter bed. Of course, the water medium will tend to evenly distribute the material over the surface of the bed.

The water medium will drain away from the finely divided organic material on the upper surface of the sand layer, will pass through the sand and stone layers, and will be collected through the pipe system 182. The outlet 200 of the pump 185 is coupled to a pipe system 202 which feeds the various water jets of the settling tank and the hydro-cutter. The remainder of the reclaimed water is fed by the pipe system 202 into the settling tank.

An overflow tank 204 is provided for the processing system. Although shown in FIGURE 2 as being adjacent the filter bed, it may be provided adjacent the settling tank. The settling tank has a plurality of outlets 206 below the top of its wall, covered by screens, which maintain a maximum level of water in the settling tank 12. The outlets are coupled to a conduit which has an inlet into the upper portion of the overflow tank 204. As large quantities of collected garbage are dumped during the peak collection hours into the settling tank, the water level therein will rise. The overflow will be discharged into the tank 204. A valved outlet is provided in the bottom portion of the tank 204 and coupled to the inlet of the pump 184. During the off-collection hours, when garbage is not being dumped into the settling tank, the water level therein will tend to fall. Water will then be returned from the overflow tank to maintain the water level in the settling tank substantially constant.

The filter beds may be operated alternately. While one bed is being loaded and draining, the other bed may be unloaded of its layer of finely divided organic material. A mobile crane, not shown, having a clam shell bucket, is utilized to scoop up the drained material to load trucks which convey the material to the windrowing area. Here the trucks unload the material into windrows to dry and compost initially anerobically. After a suitable interval of anerobic composting, a truck mounted auger, such as is used for digging post holes, is utilized to drill holes through the windrows, permitting aerobic composting to take place. The auger may be of extra large diameter, such as three feet. The aerobic composting accelerates the conversion of the garbage into fertilizer. When the composting is completed, the particular windrow may be scooped up and packaged as fertilizer.

As previously mentioned, the paper content of the collected garbage may be removed from the garbage before it is dumped into the settling tank. This garbage may be processed into pulp by a pulping machine located adjacent the settling tank. Discharged water from the pulping machine may be brought to the overflow tank for recycling.

It will be appreciated that the above described system has several significant advantages. It permits the garbage, as collected, to be stored underwater, thereby avoiding the infestation problems with rats, lice, etc. found in atmospheric storage. It also minimizes the total quantity of water utilized. This provides for the economical use of non-sea water. This is significant as it is desirable to avoid using sea water which would salt the ultimately produced fertilizer.

When the collected garbage is dumped into the settling tank, the denser materials, such as glass, metals and plastics sink to the bottom. After the mobile shredder has passed over a portion of the tank, a mobile crane with a clam shell bucket is utilized to dig out the solids and to load them on a truck which conveys this material to a solids preparation area. Here the ferrous metals are removed magnetically and baled. The non-ferrous metals and other solids may be sorted by hand and packaged. At intervals, the settling tank may be closed down and cleaned out. On such occasions, the floor of the tank may be visually inspected for small objects of value which settled to the bottom and were not caught by the clam shell bucket.

This invention has thus been described, but it is desired to be understood that it is not confined to the particular forms of usages shown and described, the same being merely illustrative, and that the invention may be carried out in other ways without departing from the spirit of the invention; and, therefore, the right is broadly claimed to employ all equivalent instrumentalities coming within the scope of the appendant claims, by means of which the objects of this invention are attained and the new results accomplished, as it is obvious that the particular embodiments here shown and described are only some of the many that can be employed to obtain these objects and to accomplish these results.

What is claimed is:

1. Apparatus of the class described, comprising:
   tank means containing a suspension medium for receiving garbage including relatively light organic material and relatively dense other material;
   first separator means operative within said tank means for removing the relatively light material and suspension medium from said tank means;
   dividing means for finely dividing the removed material; and
   second separator means for removing the suspension medium from the finely divided material.

2. Apparatus of the class described, comprising:
   tank means containing a suspension medium for receiving garbage including relatively light organic material and relatively dense other material;
   first separator means operative within said tank means for removing the relatively light material and suspension medium from said tank means;
   dividing means coupled to said first separator means for finely dividing the removed material;
   second separator means coupled to said dividing means for removing the suspension medium from the finely divided material; and
   return means coupled to said second separator means for returning the removed suspension medium to said tank means.

3. Apparatus for separating material, comprising:
   tank means containing a suspension medium, for receiving garbage including relatively light organic material and relatively dense other material; and
   separator means operative within said tank means including an outlet in said tank means, carriage means having means for cutting material disposed within the suspension medium, and having means disposed within the suspension medium for causing a current through said cutting means.

4. Apparatus for separating material, comprising:
   tank means containing a suspension medium, for receiving garbage including relatively light organic material and relatively dense other material; and
   separator means operative within said tank means including an outlet in said tank means, carriage means supported for movement above said tank means, having means for cutting material disposed within the suspension medium, and having means disposed within the suspension medium for causing a current through said cutting means and for moving said carriage means.

5. Apparatus for separating material, comprising:
   a tank containing water and having side walls, for receiving garbage including relatively light organic material and relatively dense other material; and
   a carriage supported for movement along the tops of said side walls, a double edged grid supported from said carriage and disposed within the water, a propeller supported from said carriage and disposed within the water for causing a current through said grid and for moving said carriage.

6. Apparatus for separating material, comprising:
   an elongated tank containing water and having side walls, for receiving garbage including relatively light organic material and relatively dense other material;
   an outlet in one end of said elongated tank spaced above the bottom of said tank;
   means coupled to said outlet for providing a flow of water from said tank through said outlet; and
   a carriage supported for movement along the length of said tank along the top of said sidewalls, a double edged grid supported from said carriage and disposed within the water, a propeller supported from said carriage and disposed within the water for causing a current through said grid and for moving said carriage to and fro along the length of said tank.

7. Apparatus for separating material, comprising:
   an elongated tank containing water and having side walls, for receiving garbage including relatively light organic material and relatively dense other material;
   an outlet in one end of said elongated tank spaced above the bottom of said tank;
   means coupled to said outlet for providing a flow of water from said tank through said outlet;
   a carriage supported for movement along the length of said tank along the top of said side walls, a double edged grid supported from said carriage and disposed within the water, a propeller supported from said carriage and disposed within the water for causing a current through said grid and for moving said carriage to and fro along the length of said tank; and
   means for causing turbulence in the water in said tank.

8. Apparatus for separating material, comprising:
   an elongated tank containing water and having side walls, for receiving garbage including relatively light organic material and relatively denser other material;
   first means operative within said tank for causing turbulence in the water therein;
   an outlet in one end of said tank spaced above the bottom of said tank;
   second means coupled to said outlet for providing a flow of water from said tank through said outlet, whereby the light material is carried out with the water while the denser material settles to the bottom of said tank, and for finely dividing the light material carried through said outlet; and
   third means coupled to said second means for receiving the flow of water and finely divided material and for separating the water from the finely divided material.

9. Apparatus for separating material, comprising:
   an elongated tank containing water and having side walls, for receiving garbage including relatively light organic material and relatively denser other material;
   first means operative within said tank for causing turbulence in the water therein;
   an outlet on one end of said tank spaced above the bottom of said tank;
   second means coupled to said outlet for providing a flow of water from said tank through said outlet, whereby the light material is carried out with the water while the denser material settles to the bottom of said tank, and for finely dividing the light material carried through said outlet;

third means coupled to said second means for receiving the flow of water and finely divided material and for separating the water from the finely divided material; and fourth means coupled to said third means, for receiving the separated water and for returning this water to said tank.

10. Apparatus for separating material, comprising:

an elongated tank containing water and having side walls, for receiving garbage including relatively light organic material and relatively denser other material;

first means operative within said tank for causing turbulence in the water therein;

an outlet in one end of said tank spaced above the bottom of said tank;

second means coupled to said outlet for providing a flow of water from said tank through said outlet, whereby the light material is carried out with the water while the denser material settles to the bottom of said tank, and for finely dividing the light material carried through said outlet;

third means coupled to said second means for receiving the flow of water and finely divided material and for separating the water from the finely divided material;

fourth means coupled to said third means, for receiving the separated water and for returning this water to said tank; and fifth means coupled to said tank for receiving water displaced by the garbage received by said tank.

11. Apparatus for separating material, comprising:

an elongated tank containing water and having side walls, for receiving garbage including relatively light organic material and relatively denser other material;

first means operative within said tank for causing turbulence in the water therein;

an outlet in one end of said tank spaced above the bottom of said tank;

second means coupled to said outlet for providing a flow of water from said tank through said outlet, whereby the light material is carried out with the water while the denser material settles to the bottom of said tank, and for finely dividing the light material carried through said outlet;

third means coupled to said second means for receiving the flow of water and finely divided material and for separating the water from the finely divided material;

fourth means coupled to said third means for receiving the separated water and for returning this water to said tank;

fifth means coupled to said tank for receiving water displaced by the garbage received by said tank; and said fourth means also being coupled to said fifth means for returning water received therein to said tank as said tank is emptied by said second means.

12. Apparatus for separating material, comprising:

an elongated tank containing water and having side walls, for receiving garbage including relatively light organic material and relatively denser other material;

first means operative within said tank for causing turbulence in the water therein;

an outlet in one end of said tank spaced above the bottom of said tank;

a tubular conduit disposed in said outlet including a perforated plate closing said conduit, and an impeller providing a flow of water from said tank through the perforations of said plate, whereby the light material is carried through said conduit with said water while the denser material settles to the bottom of said tank, and said perforated plate finely divides the material passing therethrough; and second means coupled to said conduit for receiving the flow of water and finely divided material and for separating the water from the finely divided material.

13. Apparatus for separating material, comprising:

an elongated tank containing water and having side walls for receiving garbage including relatively light organic material and relatively denser other material;

first means operative within said tank for causing turbulence in the water therein;

an outlet in one end of said tank spaced above the bottom of said tank;

a tubular conduit disposed in said outlet including a perforated plate closing said conduit, and an impeller providing a flow of water from said tank through the perforations of said plate, whereby the light material is carried through said conduit with the water while the denser material settles to the bottom of said tank, and the perforated plate finely divides the material passing therethrough;

second means coupled to said conduit for receiving the flow of water and finely divided material and for separating the water from the finely divided material; and third means coupled to said second means for receiving the separated water and for returning this water to said tank.

14. Apparatus for separating material, comprising:

an elongated tank containing water and having side walls for receiving garbage including relatively light organic material and relatively denser other material;

first means operative within said tank for causing turbulence in the water therein;

an outlet in one end of said tank spaced above the bottom of said tank;

a tubular conduit disposed in said outlet including a perforated plate closing said conduit, and an impeller providing a flow of water from said tank through the perforations of said plate, whereby the light material is carried through said conduit with the water while the denser material settles to the bottom of said tank, and said perforated plate finely divides the material passing therethrough;

second means coupled to said conduit for receiving the flow of water and finely divided material and for separating the water from the finely divided material;

third means coupled to said second means for receiving the separated water and for returning this water to said tank; and fourth means coupled to said tank for receiving water displaced by the garbage received by said tank.

15. Apparatus for separating material, comprising:

an elongated tank containing water and having side walls for receiving garbage including relatively light organic material and relatively denser other material;

first means operative within said tank for causing turbulence in the water therein;

an outlet in one end of said tank spaced above the bottom of said tank;

a tubular conduit disposed in said outlet including a perforated plate closing said conduit, and an impeller providing a flow of water from said tank through the perforations of said plate, whereby the light material is carried through said conduit with the water while the denser material settles to the bottom of said tank, and said perforated plate finely divides the material passing therethrough;

second means coupled to said conduit for receiving the flow of water and finely divided material and for separating the water from the finely divided material;

third means coupled to said second means for receiving the separated water and for returning this water to said tank;

fourth means coupled to said tank for receiving water displaced by the garbage received by said tank; and said third means also being coupled to said fourth means for returning water received therein to said tank as said tank is emptied by said impeller.

16. Apparatus for separating material, comprising:

an elongated tank containing water and having side walls for receiving garbage including relatively light organic material and relatively denser other material;

first means operative within said tank for causing turbulence in the water therein;

an outlet in one end of said tank spaced above the bottom of said tank;

second means coupled to said outlet for providing a flow of water from said tank through said outlet, whereby the light material is carried out with the water while the denser material settles to the bottom of said tank, and for finely dividing the light material carried through said outlet;

a filter bed; and a flume coupled to said second means for receiving the flow of water and finely divided material and for distributing the water and material on said filter bed, whereby the material remains on said bed while the water drains through said bed.

17. Apparatus for separating material, comprising:

an elongated tank containing water and having side walls for receiving garbage including relatively light organic material and relatively denser other material;

first means operative within said tank for causing turbulence in the water therein;

an outlet in one end of said tank spaced above the bottom of said tank;

second means coupled to said outlet for providing a flow of water from said tank through said outlet, whereby the light material is carried out with the water while the denser material settles to the bottom of said tank, and for finely dividing the light material carried through said outlet;

a filter bed;

a flume coupled to said second means for receiving the flow of water and finely divided material and for distributing the water and material on said filter bed, whereby the material remains on said bed while the water drains through said bed; and third means coupled to said filter bed for receiving the drained water and for returning this water to said tank.

18. Apparatus for separating material, comprising:

an elongated tank containing water and having side walls for receiving garbage including relatively light organic material and relatively denser other material;

first means operative within said tank for causing turbulence in the water therein;

an outlet in one end of said tank spaced above the bottom of said tank;

second means coupled to said outlet for providing a flow of water from said tank through said outlet, whereby the light material is carried out with the water while the denser material settles to the bottom of said tank, and for finely dividing the light material carried through said outlet;

a filter bed;

a flume coupled to said second means for receiving the flow of water and finely divided material and for distributing the water and material on said filter bed, whereby the material remains on said bed while the water drains through said bed;

third means coupled to said filter bed for receiving the drained water and for returning this water to said tank; and fourth means coupled to said tank for receiving water displaced by the garbage received by said tank.

19. Apparatus for separating material, comprising:

an elongated tank containing water and having side walls for receiving garbage including relatively light organic material and relatively denser other material;

first means operative within said tank for causing turbulence in the water therein;

second means coupled to said outlet for providing a flow of water from said tank through said outlet, whereby the light material is carried out with the water while the denser material settles to the bottom of said tank, and for finely dividing the light material carried through said outlet;

a filter bed;

a flume coupled to said second means for receiving the flow of water and finely divided material and for distributing the water and material on said filter bed, whereby the material remains on said bed while the water drains through said bed;

third means coupled to said filter bed for receiving the drained water and for returning this water to said tank; and fourth means coupled to said tank for receiving water displaced by the garbage received by said tank;

said third means also being coupled to said fourth means for returning water received therein to said tank as said tank is emptied by said second means.

20. A method of processing garbage including relatively light organic material and relatively denser material, comprising:

dumping the garbage into a tank of turbulent water wherein the denser material settles to the bottom while the light material remains suspended in the water;

drawing water and suspended material from the tank;

finely dividing the suspended material in the drawn off water; and filtering the water from the finely divided suspended material.

21. A method of processing garbage including relatively light organic material and relatively denser material, comprising:

dumping the garbage into a tank of turbulent water wherein the denser material settles to the bottom while the light material remains suspended in the water;

drawing water and suspended material from the tank;

finely dividing the suspended material in the drawn off water;

filtering the water from the finely divided suspended material; and returning the filtered water to the supply of turbulent water in the tank.

References Cited

UNITED STATES PATENTS

| | | | |
|---|---|---|---|
| 2,380,025 | 7/1965 | Chase | 241—24 |
| 3,159,353 | 12/1964 | Atwater | 241—46 |

GERALD A. DOST, *Primary Examiner.*